United States Patent
Bright et al.

(10) Patent No.: US 7,296,937 B1
(45) Date of Patent: Nov. 20, 2007

(54) TRANSCEIVER MODULE ASSEMBLY WITH UNLATCH DETECTION SWITCH

(75) Inventors: Edward J. Bright, Middletown, PA (US); Michael Fogg, Harrisburg, PA (US); Jason J. Miller, Tower City, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/429,590

(22) Filed: May 5, 2006

(51) Int. Cl.
*G02B 6/36* (2006.01)

(52) U.S. Cl. .............................. 385/92; 385/53; 385/88

(58) Field of Classification Search ............. 385/88–92
See application file for complete search history.

(56) References Cited

U.S. PATENT DOCUMENTS 6,816,376 B2 * 11/2004 Bright et al. ............... 361/704
6,819,568 B2 * 11/2004 Cao .......................... 361/728
7,090,523 B2 * 8/2006 Shirk et al. ................. 439/352

* cited by examiner

*Primary Examiner*—Jennifer Doan

(57) ABSTRACT

An electrical module assembly is provided that is configured for latching engagement with a receptacle assembly. The module assembly comprises a module housing having an exterior envelope and an interior cavity. The exterior envelope of the module housing is configured to be plugged into the receptacle assembly. A release mechanism is joined to the module housing. The release mechanism is moveable between locked and unlocked positions. The release mechanism is configured to unlock the module housing from the receptacle assembly when the release mechanism is moved from the locked position to the unlocked position. A detection switch is located within the interior cavity of the module housing. The detection switch monitors a position of the release mechanism and provides latched and unlatched state signals based on the position of the release mechanism. The latched state signal indicates that the module housing is locked in the receptacle assembly. The unlatched state signal indicates that the release mechanism is being moved to the unlocked position.

20 Claims, 7 Drawing Sheets

TRANSCEIVER MODULE ASSEMBLY WITH UNLATCH DETECTION SWITCH

BACKGROUND OF THE INVENTION

The invention relates generally to a pluggable electronic transceiver module assembly, and more particularly, to a module assembly with a switch built therein to detect when the module assembly is being unplugged from a receptacle assembly.

Various types of fiber optic and copper based transceivers are known that permit communication between electronic host equipment and external devices. These transceivers may be incorporated into cable assembly modules that can be pluggably connected to host equipment to provide flexibility in system configuration. The cable assembly modules are constructed according to various standards for size and compatibility, one standard being the Small Form-factor Pluggable (SFP) module standard. An SFP module is plugged into a receptacle that is mounted on a circuit board within host equipment. The receptacle includes an elongated guide frame, or cage, having a front that is open to an interior space, and an electrical connector disposed at a rear of the interior space of the cage. Both the connector and the guide frame are electrically and mechanically connected to the circuit board such that, when an SFP module is plugged into a receptacle, the SFP module also becomes electrically and mechanically connected to the circuit board. Conventional SFP modules and receptacles typically carry data signals at rates up to 2.5 gigabits per second (Gbps). A standard currently in development for a next generation of SFP modules, presently called the XFP standard, calls for the transceiver modules to carry data signals at rates up to 10 Gbps.

In certain applications, it is desirable to unplug the cable assembly module while the system is operational and the cable assembly module is supporting a communications link with the system. It is undesirable to unplug the cable assembly module while being used to convey data. Instead, it is preferable to shut-down the communications link before unplugging a corresponding cable assembly module.

However, conventional systems offer limited methods and structures for performing automatic shut-down of a communications link or for detecting the presence or absence of a cable assembly module. Conventional module detection methods determine that a cable assembly module is being removed at or after the point in time, at which the transceiver in the cable assembly module is electrically disconnected from the circuit board. The conventional module detection methods do not provide sufficient time for the system to shut down the communications link before unplugging the cable assembly module.

A need exists for methods and systems to determine when a cable assembly module is about to be unplugged early in the removal process.

BRIEF DESCRIPTION OF THE INVENTION

In accordance with one embodiment, an electrical module assembly is provided that is configured for latching engagement with a receptacle assembly. The module assembly comprises a module housing having an exterior envelope and an interior cavity. The exterior envelope of the module housing is configured to be plugged into the receptacle assembly. A release mechanism is joined to the module housing and is moveable between locked and unlocked positions. The release mechanism is configured to unlock the module housing from the receptacle assembly when the release mechanism is moved from the locked position to the unlocked position. A detection switch is located within the interior cavity of the module housing. The detection switch monitors a position of the release mechanism and provides latched and unlatched state signals based on the position of the release mechanism. The latched state signal indicates that the module housing is locked in the receptacle assembly. The unlatched state signal indicates that the release mechanism is being moved to the unlocked position.

In accordance with an alternative embodiment, an electrical module/receptacle system is provided. The system comprises a receptacle assembly having a guide frame and a receptacle connector. The receptacle connector and guide frame are configured to be mounted to a circuit board with the receptacle connector being positioned within the guide frame. A module assembly is included that has a module housing with an exterior envelope and an interior cavity. The exterior envelope of the module housing is configured to be plugged into the receptacle assembly. A release mechanism is joined to the module housing. The release mechanism is moveable between locked and unlocked positions. The release mechanism is configured to unlock the module housing from the receptacle assembly when the release mechanism is moved from the locked position to the unlocked position. A detection switch is located within the interior cavity of the module housing. The detection switch monitors a position of the release mechanism and provides latched and unlatched state signals based on the position of the release mechanism. The latched state signal indicates that the module housing is locked in the receptacle assembly, while the unlatched state signal indicates that the release mechanism is being moved to the unlocked position.

DETAILED DESCRIPTION OF THE INVENTION

Figure 1:
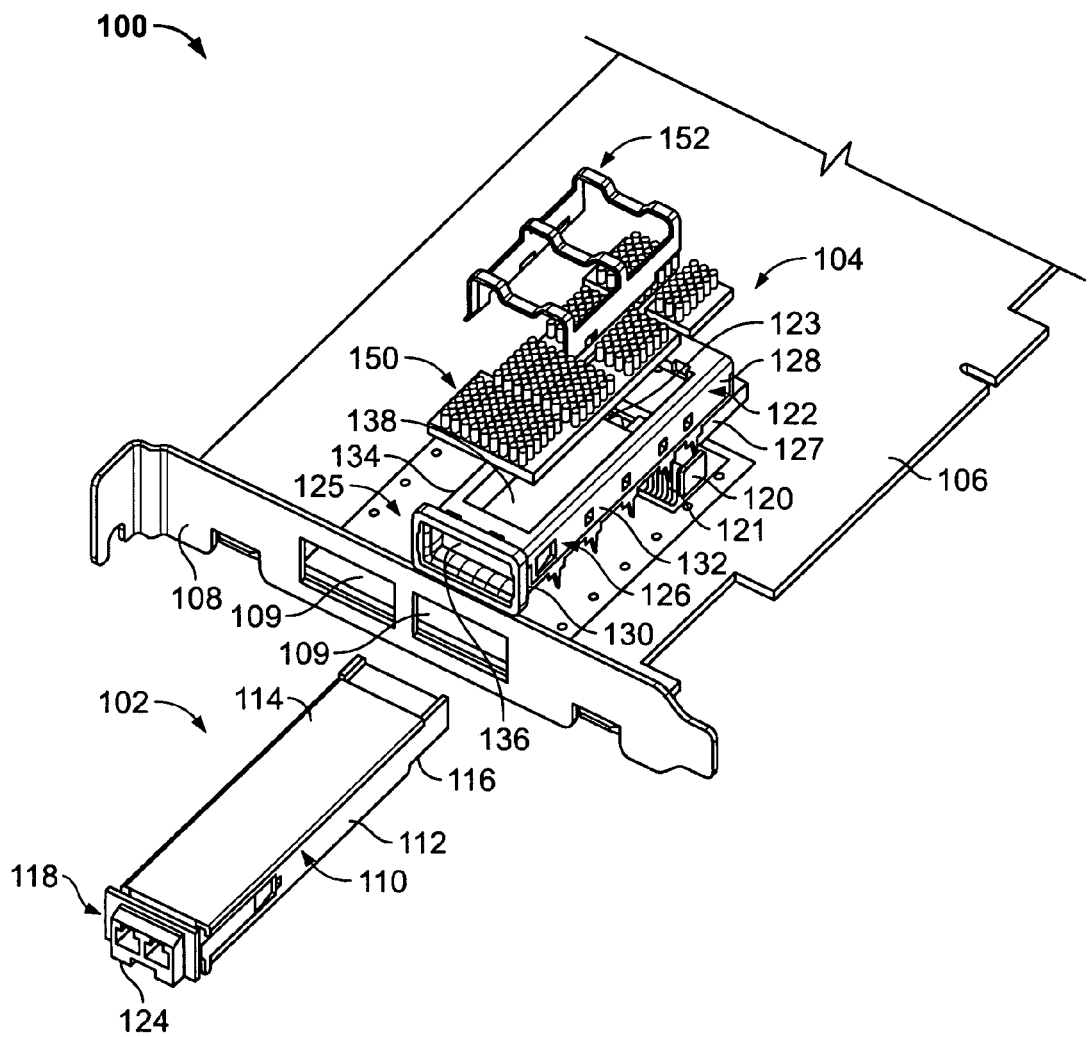
FIG. 1 is an exploded perspective view of a module assembly and a receptacle assembly formed in accordance with an embodiment of the present invention.

FIG. 1 illustrates an electrical module/receptacle system 100 formed in accordance with an exemplary embodiment of the invention. The system 100 is adapted to address, among other things, heat dissipation and electromagnetic shielding for components conveying data signals at high rates, such as data transmission rates of 10 gigabits per second (Gbs) or higher. It is appreciated, however, that the benefits and advantages of the invention may accrue equally to other data transmission rates and across a variety of systems and standards. Therefore, while embodiments of the invention are described and illustrated in the context of system 100, the invention is not intended to be limited to system 100, and system 100 is therefore provided for purposes of illustration rather than limitation.

As shown in FIG. 1, the system 100 generally includes a module assembly 102 configured to be plugged into a receptacle assembly 104 that is mounted to a host circuit board 106. The host circuit board 106 is mounted in a host system such as a router or computer (not shown). The host system typically includes a conductive chassis having a bezel 108 including openings 109 there through in substantial alignment with a respective receptacle assembly 104. The module assembly 102 has an exterior envelope that is sized to be inserted into the receptacle assembly 104 through the opening 109, and the receptacle assembly 104 is electrically common with the bezel 108. The host system maintains a communications link through the module assembly 102 and receptacle assembly 104 when plugged together.

In an illustrative embodiment, the module assembly 102 includes a module housing 110 having a base 112 and a cover 114 that are secured together to form a protective shell for a circuit board (not shown in FIG. 1) that is disposed within an interior cavity of the module housing 110. The circuit board carries electronic circuitry and devices that perform transceiver functions. An edge of the circuit board is exposed through a rear 116 of the module housing 110, and the circuit board is plugged into the receptacle assembly 104 when in a fully locked position. The module assembly 102 is adapted for installation into the receptacle assembly 104 such that a front end 118 of the module assembly 102 is extended therefrom.

The module assembly 102 and receptacle assembly 104 may be used in any application requiring an interface between a host system and electrical or optical signals. The module assembly 102 interfaces to the host system through the receptacle assembly 104 via a receptacle connector 120 which is located within a receptacle guide frame 122, also referred to as a cage. The module assembly 102 has a front end 118 that includes a connector interface that is joined to an optical fiber or electrical cable (not shown in FIG. 1). Preferably, the connector interface 124 comprises a mechanism that cooperates with a fiber or cable assembly (not shown) to secure the fiber or cable assembly to the module assembly 102.

The module assembly 102 and the receptacle assembly 104 reduce EMI emission through one or more of several EMI reduction features, including guide frame 122, a gasket assembly 125 coupled to a forward end of the guide frame 122 that interfaces with the bezel 108, and intermediate and rear gasket assemblies 123 and 127. The EMI reduction features are described in detail in U.S. Pat. No. 6,749,448 titled "Transceiver Module Assembly Ejector Mechanism", the complete disclosure of which is hereby incorporated by reference in its entirety.

As illustrated in FIG. 1, the guide frame 122 includes a stamped and formed metal body 126 that defines a shell having a top wall 128, a bottom wall 130, side walls 132, 134 and a front opening 136 into the guide frame 122. The guide frame 122 includes latch elements 196 on opposite side walls 132, 134. As explained below, the latch elements 196 engage latch surfaces on the module assembly 102 to lock the module assembly 102 in the receptacle assembly 104. The bottom wall 130 has a bottom opening to receive the receptacle connector 120. The circuit board within the module assembly 102 includes contact pads that engage contacts 121 within the receptacle connector 120 to form signal paths over which one or more communications links are established and maintained by the host system. When the module assembly 102 is inserted into the receptacle assembly 104, the guide frame 122 provides conductive walls on all sides thereof. The host board 106 includes a conductive surface provided thereon and formed as a sheet to underlie the receptacle assembly 104 to enhance the electromagnetic interference shielding.

The top wall 128 of the guide frame 122 may have a large opening overlying a cavity 138 that accommodates an optional heat sink 150. The heat sink 150 is positioned to make physical contact with the module assembly 102 when the module assembly 102 is installed into the receptacle assembly 104. A clip 152 is mounted over the heat sink 150 and is secured to the guide frame 122. The clip 152 ensures that the heat sink 150 is loaded against the module assembly 102 to facilitate thermal transfer from the module assembly 102 to the heat sink 150.

Figure 2:
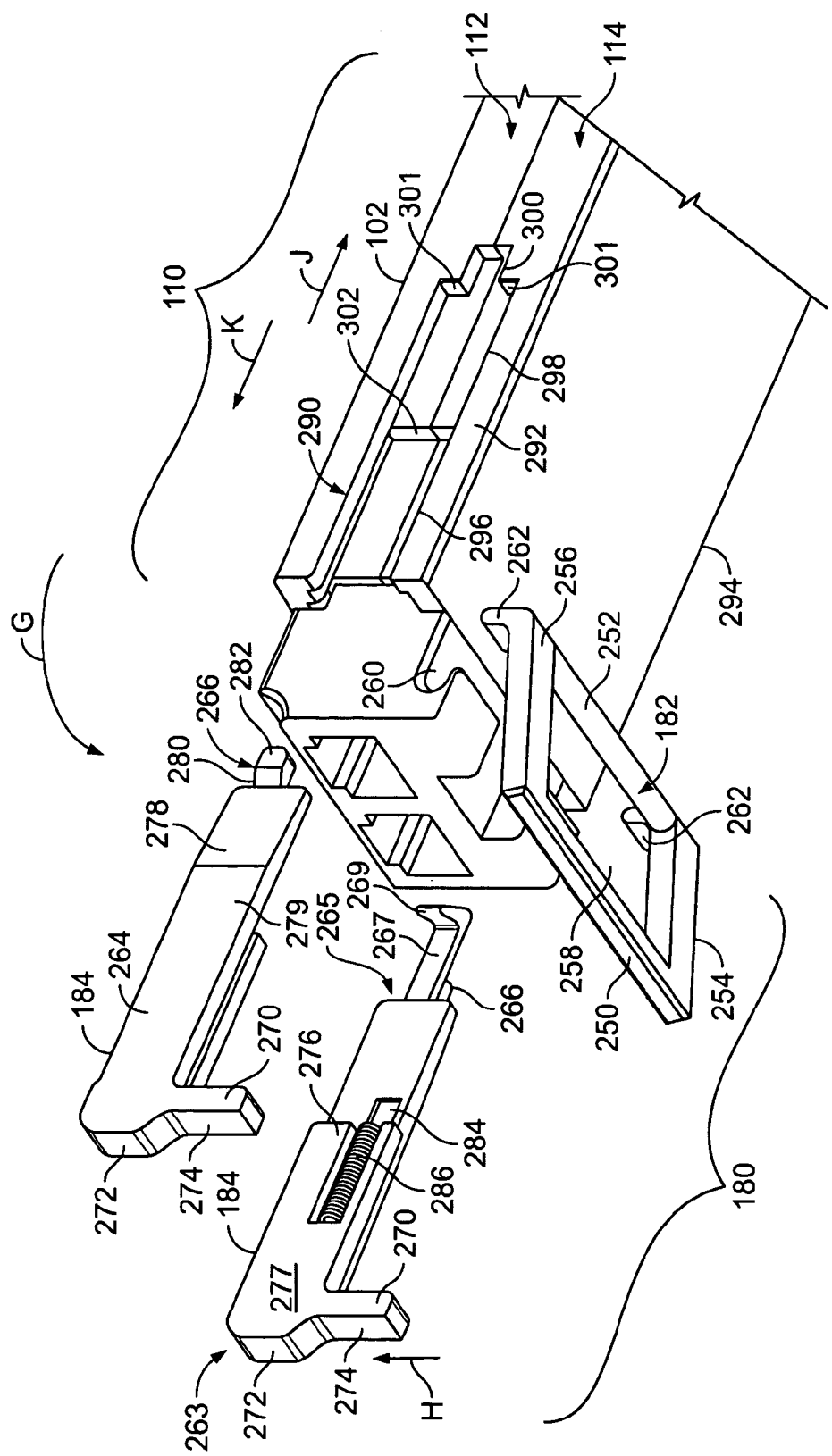
FIG. 2 is a partial exploded view of the module assembly of FIG. 1 including a release mechanism formed in accordance with an embodiment of the present invention.

FIG. 2 is an exploded view of the front end 118 of the module assembly 102 illustrating a release mechanism 180 removed from the module housing 110. The module housing 110 is formed with lower and upper half shells that constitute the base 112 and cover 114, respectively the base 112 and cover 114, when joined, form side walls 292 and 294 and define an interior cavity therebetween. The release mechanism 180 includes a pair of actuator arms 184 that are mirror images of one another and cooperate with a bail 182 to unlock the module assembly 102 from the latched position and to eject the module assembly 102 from the receptacle assembly 104 (shown in FIG. 1). The bail 182 is a generally rectangular body having a top side 250, a bottom side 252, and left and right sides 254, 256 defining an opening 258 which is dimensioned to fit around the connector interface 124 of the module assembly 102. The connector interface 124 includes a slot 260 formed in a lower end thereof, and the bottom side 252 of the bail 182 is received in the slot 260 to pivotally mount the bail 182 to the module assembly 102. An angled foot portion 262 extends from each the lower corners of the bail 182 at the intersection of the bottom side 252 and the left and right sides 254, 256.

Each actuator arm 184 includes a main body portion 264 with an axially extending ejector tab 266 projecting from a forward end 265 of the main body portion 264. A switch actuator arm 267 is formed on the main body portion 264 and extends beyond the ejector tab 266. The switch actuator arm 267 is L-shaped with a switch engagement tip 269 located at the outer end of the switch actuator arm 267. The switch actuator arm 267 operates with a detection switch as explained below to indicate a position of the release mechanism 180. The main body portion 264 also include a foot portion 270 located at a rear end 263 of the main body portion 264. The foot portion 270 extends substantially perpendicularly to the main body portion 264. A latched contact stop portion 272 is located at the rear end 263. The main body portion 264 includes an interior surface 277 with a stepped contour 276 and an exterior surface 279 with a tapered leading end 278. The tapered leading end 278 has a gradually reduced thickness to form a ramped surface extending to the ejector tab 266. The ejector tab 266 has a reduced width relative to the main body portion 264 and includes a ramped surface 280 extending to a raised boss 282.

The ramped surface 280 of the ejector tab 266 is inclined oppositely to the tapered leading end 278 of the actuator arms 184. The tapered leading end 278 and the ramped surface 280 are arranged side-by-side in a valley configuration and thus are sloped toward one another. The interior surface 277 of each actuator arm 184 includes a longitudinal slot 284 which houses a bias element 286, such as a coil spring, in an exemplary embodiment. The bias element 286 provides spring-loaded release actuation of the module assembly 102 as the bail 182 is manipulated by a user.

The module assembly 102 includes a retention cavity 290 on each of the side walls 292, 294 thereof. The retention cavities 290 are shaped generally complementary to the outer profile of the respective actuator arms 184. Each of the retention cavities 290 includes a first portion 296, a second portion 298, and a third portion 300. The first portion 296 has a width slightly larger than a width of the main body portion 264 of the actuator arm 184 and a depth substantially equal to a full depth of the main body portion 264. The second portion 298 has a width substantially equal to the first portion but a depth substantially equal to the reduced depth of the main body portion 264 adjacent the tapered leading end 278. The third portion 300 has a substantially equal depth to the second portion 298 but a reduced width that is slightly larger than a width of the ejector tab 266. The first and second portions 296, 298 of the retention cavity 290 are configured to accept the stepped contour 276 of the main body portion 264 of the actuator arms 184, and the third portion 300 is configured to receive the ejector tab 266 with sliding engagement. A shoulder 302 separates the first portion 296 from the second portion 298 and provides an abutment or seat for the bias element 286 of each of the actuator arms 184. The retention cavity 290 includes a latch surface 301 between the second and third portions 298 and 300. The latch elements 196 on the guide frame 122 (FIG. 1) engage the latch surfaces 301 to lock the module assembly 102 in the receptacle module 104.

In the example of FIG. 2, the base 112 and cover 114 fit together to define the interior cavity. The retention cavity 290 on side wall 294 (not visible in FIG. 2), that receives the actuator arm 184 with the switch actuator arm 267, includes an opening into the interior cavity within the base 112 and cover 114. The opening is located in the second and third portions 298 and 300 of the side wall 294. When the actuator arm 184 is loaded into the retention cavity 290 on the side wall 294, the switch actuator arm 267 extends through the opening in the second and third portions 298 and 300. The structure and operation of the switch actuator arm 267 are described in more detail below.

During use, as the module assembly 102 is inserted into the receptacle assembly 104, the ejector tabs 266 contact the latch elements 196 (shown in FIG. 1) of the guide frame 122 and deflect the latch elements 196 outwardly to allow the module assembly 102 to be inserted into the guide frame 122. When the module assembly 102 is fully inserted, the ejector tabs 266 clear the latch elements 196, and the latch elements 196 deflect inwardly upon the tapered leading ends 278 of the actuator arms 184. The latch surfaces 301 therefore become latched behind the latch elements 196 of the guide frame 122 when the module assembly 102 is fully installed in the guide frame 122.

In the latched position, the bail 182 is positioned substantially upright with the foot portions 262 of the bail 182 contacting the foot portions 270 of the actuator arms 184 at an obtuse angle. The latched contact stop portions 272 of the actuator arms 184 contact the sides 254, 256 of the bail 182. The bias elements 286 are loaded in compression and maintain the bail 182 in the latched position. As the bail 182 is pivoted in the direction of arrow G away from the connector interface 124 about the bottom side 252, the foot portions 262 of the bail 182 slide upwardly against the foot portions 270 of the actuator arms 184 in the direction of arrow H to form a right angle between the foot portions 270 and 262. When moving from the obtuse to the right angle orientation, the foot portions 262 of the bail 182 cause the actuator arms 184 to move longitudinally inward into the retention cavities 290 in the direction of arrow J, thereby further loading the bias elements 286 in the actuator arms 184.

Further pivoting of the bail 182 begins to move the foot portions 262 into an obtuse orientation and away from the foot portions 270 which permits the bias elements 286 to relax and push the actuator arms 184 forward in the direction of arrow K toward the connector interface 124. At this point, the latch elements 196 of the guide frame 122 are in contact with the ramped surfaces 280 of the ejector tabs 266 of the actuator arms 184. As the bias elements 286 force the actuator arms 184 in a forward direction of arrow K, the ramped surfaces 280 deflect the latch elements 196 outwardly out of retention cavities 290 until the bosses 282 and latch surfaces 301 clear the latch elements 196. The actuator arms 184 are displaced forwardly by the bias elements 286, and the ejector tabs 266 are released from the latch elements 196 of the guide frame 122. In the unlatched position, the module assembly 102 may be removed from the receptacle assembly 104 by pulling the bail 182 to slide the module assembly 102 out of the receptacle assembly 104. The bias elements 286 maintain the bail 182 in the latched position until the bail 182 is rotated. The bail 182 may be pivoted back toward the connector interface 124 to position the actuator arms 184 back to the latched position wherein the ejector tabs 266 engage the latch elements 196 of the receptacle assembly 104.

Figure 3:
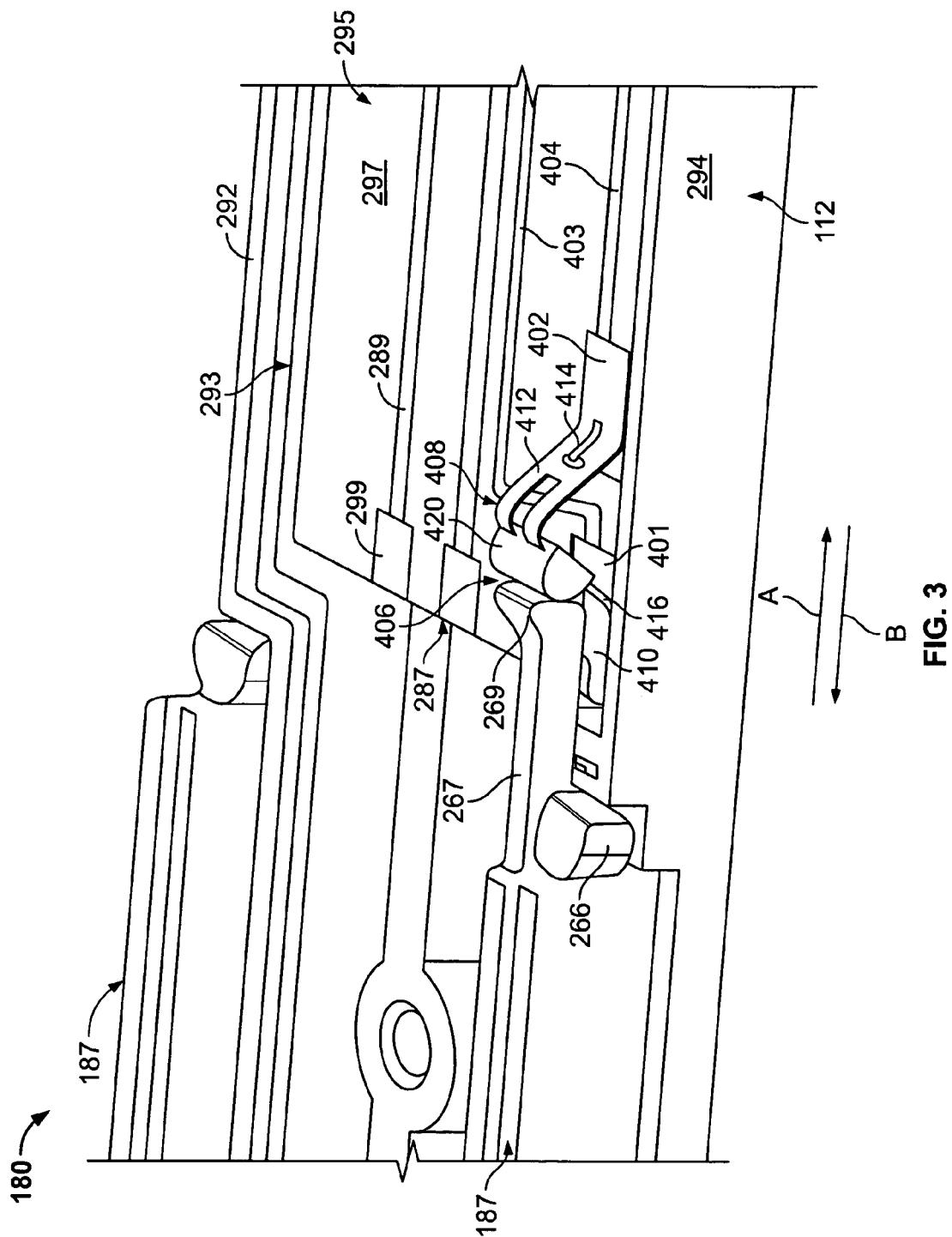
FIG. 3 is a side elevation view of a portion of the module assembly of FIG. 2 with a cover of the module assembly removed and a detection switch in a closed position.

FIG. 3 illustrates a side elevation view of a portion of the module assembly 102 with the cover 114 removed. As shown in FIG. 3, the base 112 includes sidewalls 292 and 294 that are separated by an interior cavity 293. The interior cavity 293 receives a module board, such as printed circuit board 295. The circuit board 295 has a top surface 297 that is populated with active and passive components and includes contact pads 299 that are configured to be joined to wires or contacts of a cable assembly, mating plug and the like. The contact pads 299 are joined to traces 289 that extend along the top surface 297. The top surface 297 also includes a present pin contact pad 401 and a power contact pad 402. The present pin contact pad 401 and power contact pad 402 are joined to corresponding switch signal traces 403 and 404, respectively, that extend along the length of the circuit board 295, to be connected to electronics provided on the host circuit board 106 (FIG. 1).

A detection switch 406 is mounted proximate to a lead end 287 of the circuit board 295. The detection switch 406 is engaged and released by the switch engagement tip 269 of the switch actuator arm 267 as the actuator arm 184 is linearly moved along the directions denoted by arrows A and B between latched and unlatched states or positions, respectively. The detection switch 406 monitors a position of the release mechanism 180 and provides latched and unlatched state signals over the switch signal traces 403 and 404 based on the position of the release mechanism 180. The latched state signal indicates that the module housing 110 is fully locked in the guide frame 122. The unlatched state signal indicates that the release mechanism 180 is being moved to the unlocked position. The detection switch 406 generates the unlatched state signal at some time interval before signal contacts on circuit board 295 disconnect from contacts 121 in the receptacle connector 120. For example, the detection switch 406 may generate the unlatched state signal when the bail 182 initially begins to move the release mechanism 180 in the unlatching direction of arrow B from the locked position toward the unlocked position.

The detection switch 406 includes a spring element 408 having a base portion 410 and a V-shaped body 412 formed integrally at a hinge area 416 with the base portion 410. A dielectric member 420 is provided on the V-shaped body 412 at a position to engage the release mechanism 180 to maintain an insulation interface between the switch spring element 408 and the switch engagement tip 269 of the switch actuator arm 267. The V-shaped body 412 has outer tip portions 414 that are positioned above the power contact pad 402. The V-shaped body 412 pivots at the hinge area 416 along arcuate paths denoted by arrows C and D between open and closed positions, respectively, with the power contact pad 402.

Figure 4:
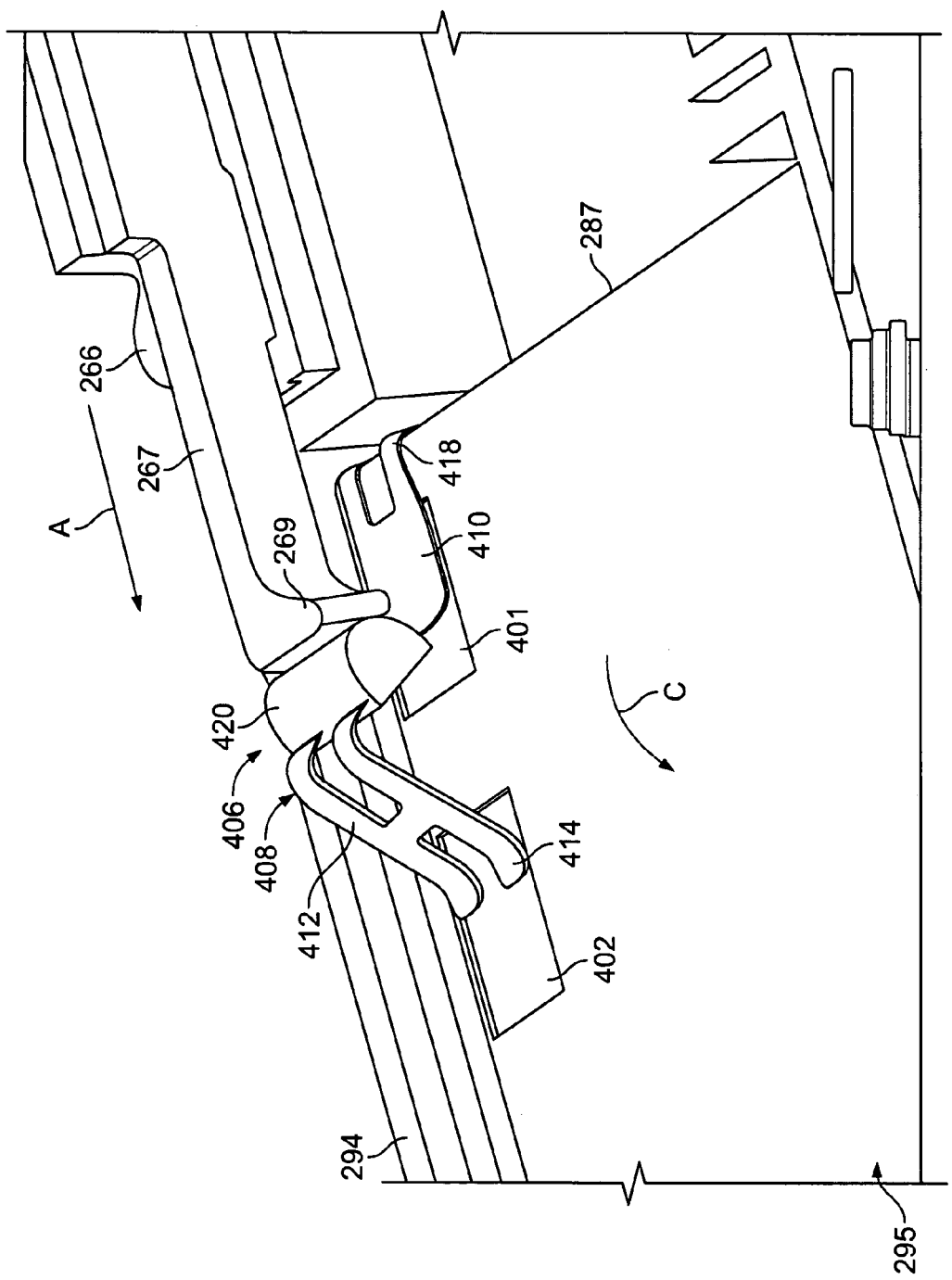
FIG. 4 is a side elevation view of the portion of the module assembly shown in FIG. 3 from an opposite side.

FIG. 4 illustrates a side elevation view opposite to the view of FIG. 3 of the detection switch element 406 and switch actuator arm 267. When the switch actuator arm 267 is slid in the direction of arrow A toward the switch spring element 408, the switch engagement tip 269 engages the dielectric member 420 and forces the outer tip portions 414 of the V-shaped body 412 downward along path C into engagement with the power contact pad 402, thereby establishing a closed position. When the outer tip portions 414 engage the power contact pad 402, a closed circuit is formed between the present pin contact pad 401 and the power contact pad 402. When the closed circuit is formed, a latched state signal is conveyed to electronic components on the host board 106 or host system indicating that the module assembly 102 is fully plugged into the receptacle assembly 104.

As shown in FIG. 4, the base portion 410 is secured to the circuit board 295 with a curved clip formed at end 418 that wraps about the lead end 287 of the circuit board 295. Alternatively, the base portion 410 may be secured by solder or other means to the contact circuit pad 401.

Figure 5:
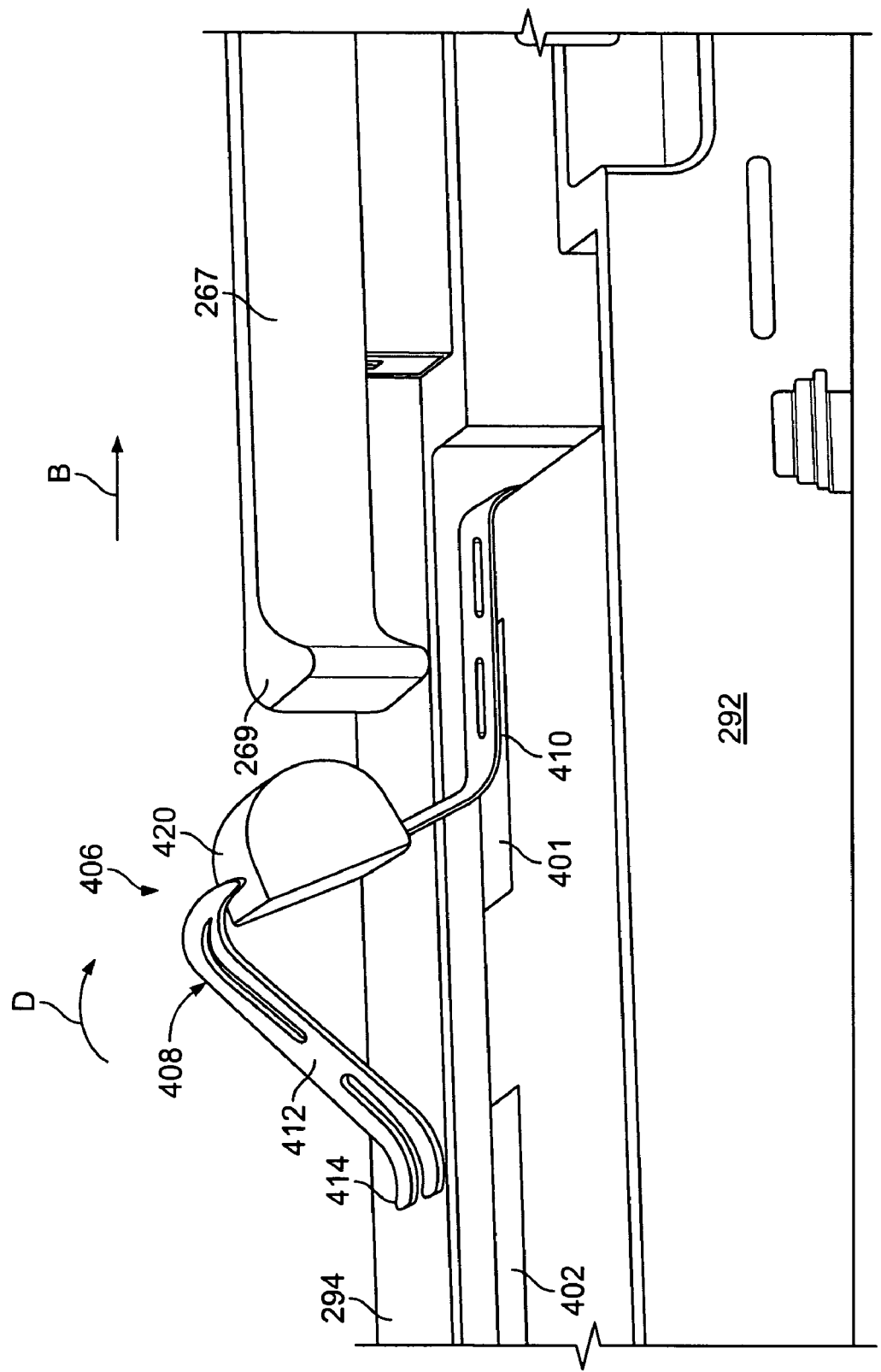
FIG. 5 is a side elevation view of the portion of the module assembly of FIG. 3 with the detection switch in an open position.

FIG. 5 illustrates the detection switch 406 and the switch actuator arm 267 when moved relative to the module housing 110 to the open circuit or fully unlatched position. When the switch actuator arm 267 is moved to the fully unlatched position, the switch engagement tip 269 is spaced apart from the dielectric member 420. The base portion 410 and the V-shaped body 412 are formed with a predetermined obtuse angle 417 therebetween at the hinge area 416, such that, when the switch actuator arm 267 is slid in the direction of arrow B toward the unplugged position, the outer tip portions 414 of the V-shaped body 412 rotate along path D upward and away from the power contact pad 402. When the outer tip portions 414 disengage from the power contact pad 402, an open circuit is formed between the switch contact pad 401 and the power contact pad 402. When the open circuit is formed, an unlatched state signal is conveyed to electronic components on the host board 106 (FIG. 1) indicating that the module assembly 102 is about to be unplugged from the receptacle assembly 104.

The dimensions and spacing of the actuator arm 184, switch actuator arm 267, ejector tabs 266 and detection switch 406 are configured such that the outer tip portions 414 disengage from the power contact pad 402 before or substantially simultaneously with disengagement of the ejector tabs 266 from the latched position, thereby providing the unlatched state signal before the module assembly 102 is unplugged from the receptacle assembly 104, by a predetermined minimum shut-down time interval. For example, it may be desirable to provide the unlatched state signal by a minimum shut-down time interval of approximately between 50 and 500 milliseconds before contacts within the module assembly 102 and receptacle assembly 104 electrically disconnect from one another. As a further example, it may be desirable to provide the unlatched state signal by a predetermined shut-down time interval of approximately 100 milliseconds before contacts within the module assembly 102 and receptacle assembly 104 electrically disconnect from one another.

Figure 6:
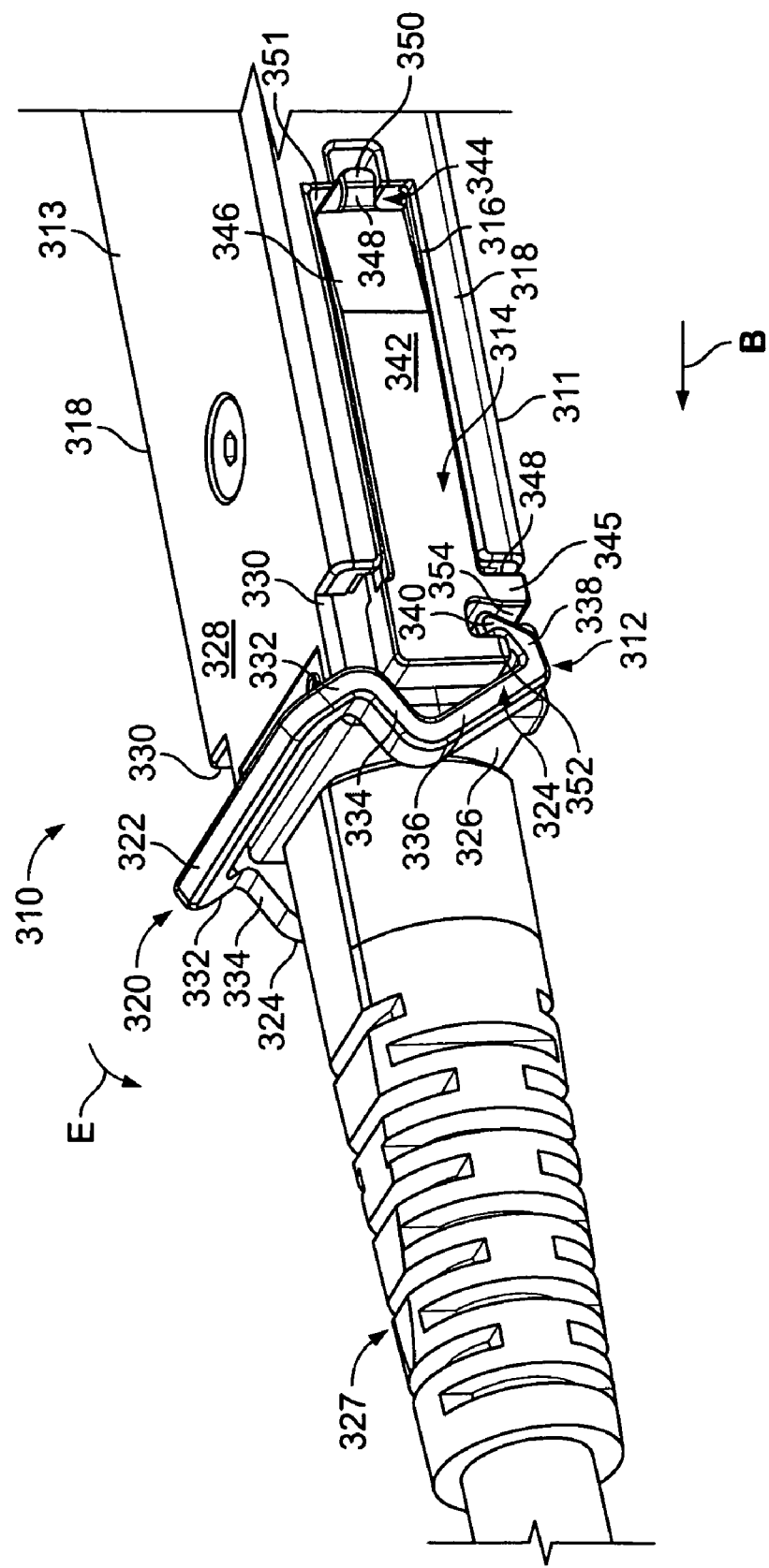
FIG. 6 is a side perspective view of a module assembly formed in accordance with an alternative embodiment.

FIG. 6 is a perspective view of a module assembly 310 formed in accordance with an alternative embodiment. The module assembly 310 includes a release mechanism 312 that includes a pair of actuator arms 314 which are constructed in a substantially similar manner to one another. Each actuator arm 314 extends within a retention cavity 316 formed within corresponding side walls 318 of the module assembly 310. The actuator arms 314 extend longitudinally along the side walls 318, and the actuator arms 314 cooperate with a bail 320 to release the module assembly 310 from the receptacle assembly 104 as described below.

At least one of the actuator arms 314 include a switch actuator arm similar to the switch actuator arm 267 shown in FIGS. 2-5. The module assembly 310 includes half shells forming a base 311 and a cover 313, that collectively define an interior cavity. The interior cavity within the module assembly 310 includes a circuit board having a detection switch thereon that is similar to the detection switch 406 in FIGS. 2-5.

The bail 320 includes a top side 322 extending transversely across the module assembly 310 between the side walls 318, and two opposing lateral sides 324 which extend downward from the top side 322 in a plane parallel to the side walls 318 of the module assembly 310. The top side 322 and lateral sides 324 are dimensioned to receive a connector interface 326 of the module assembly 310 which provides a site for connection to a cable assembly 327, which may include an optical fiber or electrical cable, strain relief features, etc. The connector interface 326 includes an aperture (not shown) on each lateral side of the module assembly 310, and each of the lateral sides 324 of the bail includes an inward facing cylindrical pin (not shown) which fits into the apertures to pivotally or rotatably mount the lateral sides 324 of the bail 320 to the module assembly 310.

In an exemplary embodiment, the front end 328 of the module assembly 310 includes notched corners 330 that facilitate operation of the bail 320 as described below. The lateral sides 324 of the bail include downwardly extending vertical portions 332 extending substantially perpendicularly to the horizontal top side 322 at either end thereof. Horizontal shelf portions 334 extend in a perpendicular orientation from the vertical portions 332 but in the same plane as the vertical portions 332 of the bail 320, and vertical actuator portions 336 extend from the shelf portions 334 in a parallel arrangement to the vertical portions 332. A hook portion 338 extends from distal ends of each of the actuator portions 336 of the bail 320, and the hook portions 338 include engagement ledges 340 extending opposite the actuator portions 336.

The actuator arms 314 include a main body portion 342 including an axially extending ejector tab 344, and a foot portion 345 extending substantially perpendicularly to the main body portion 342. The main body portion 342 includes a tapered leading end 346 which has a gradually reduced thickness to form a ramped surface extending to the ejector tab 344. The ejector tab 344 has a reduced width relative to the main body portion 342 and includes a ramped surface 348 extending to a raised boss 350. The ramped surface 348 of the ejector tab 344 is inclined oppositely to the tapered leading end 346 of the actuator arms 314.

The foot portion 345 of the actuator arms 314 includes a vertical opening or slot 354 which defines an engagement surface 352 for the hook 338 of the bail 320. As illustrated in FIG. 6, the bail 320 is rotated about the front end 328 of the module assembly 310 in the direction of arrow E until the ledge 340 of the hook 338 is in contact with the engagement surface 352 of the slot 354 in the actuator arms 314. When the module assembly 310 is inserted into receptacle assembly 104, the latch elements 196 of the guide frame 122 are in contact with latch surfaces 351 in the retention cavities 316.

As the bail 320 continues to be rotated in the direction of arrow E, the engagement of the ledges 340 and the hooks 338 displace or pull the actuator arms 314 in a direction of arrow B which extends parallel to a longitudinal axis of the module assembly 310. As the actuator arms 314 are moved in the forward direction of Arrow B, the ramped surfaces 348 outwardly deflect the latch elements 196 of the guide frame 122 until the latch surfaces 351 and bosses 350 clear and the latch elements 196 and the retention tabs 266 are released from the latch elements 196 of the guide frame 122. In the unlatched position, the module assembly 310 may be removed from the receptacle assembly 104 by continuing to pull the bail 320 in the direction of arrow E to slide the module assembly 310 out of the receptacle assembly 104.

Due to direct engagement of the hooks 338 of the bail 320 and the slots 354 of the actuator arms 314, release of the module assembly 310 from a receptacle assembly 104 is accomplished without internal spring elements. Manufacturing and assembly costs are therefore reduced while nonetheless providing an effective and reliable latch and release mechanism.

Figure 7:
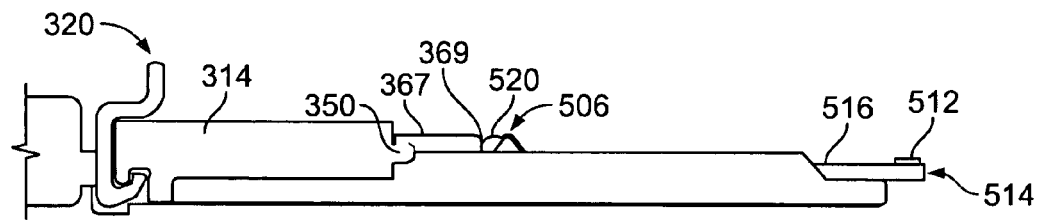
FIG. 7 is a side view of a portion of the module assembly of FIG. 6 with a cover of the module housing removed.

FIG. 7 is a side view of the module assembly 310 with the cover 313 removed. A circuit board 516 is shown with signal contacts 512 located proximate to a forward end 514 thereof. The signal contacts 512 engage contacts 121 (FIG. 1) in the receptacle connector 120. The bail 320 and actuator arm 314 are in the fully locked or plugged position. FIG. 7 illustrates a switch actuator arm 367 provided on the outer end of the actuator arm 314. The switch actuator arm 367 includes a switch engagement tip 369 that engages dielectric member 520 on detection switch 506. As explained above, the dimensions and spacing of the actuator arm 314, switch actuator arm 367, ejector tabs 350 and detection switch 506 are configured such that the detection switch 506 generates an unlatched state signal before or substantially simultaneously with an initial movement of the actuator arm 314, thereby providing the unlatch state signal well before the contacts 512 on the forward end 514 of the circuit board 516 are disconnected from the contacts 121 in receptacle assembly 104, by a minimum shut-down time interval.

Figure 8:
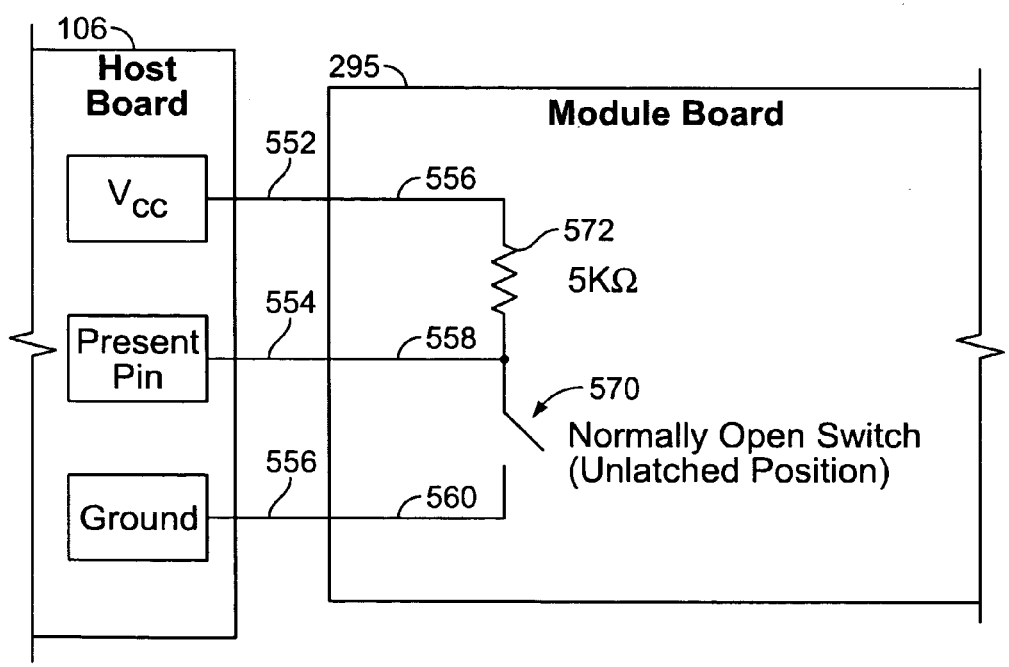
FIG. 8 is a schematic diagram of detection switch logic utilized in accordance with an embodiment of the present invention.

FIG. 8 illustrates a schematic diagram of an unlatch detection circuit 550 implemented in connection with an embodiment of the present invention. The circuit 550 includes a host board 106 that is electrically joined to a circuit or module board, such as circuit board 295 (FIG. 3). When the circuit board 295 is joined to the host board 106, power source Vcc contact 552, present pin 554 and ground contact 556 are interconnected therebetween. Traces 556, 558 and 560 extend from the power source Vcc contact 552, present pin 554 and ground contact 556 along the length of the circuit board 295. The power source Vcc contact 552 and present pin 554 terminate at a power contact pad and a present pin contact pad, such as power contact pad 402 and present pin contact pad 401 (FIG. 3), respectively.

FIG. 8 illustrates a detection switch 570 that corresponds to the unlatch switch 406. The detection switch 570 is a normally open switch. When the detection switch 570 is closed, a "latched" state signal is provided along trace 558 to the present pin 554. The "latched" state signal indicates that the release mechanism is in a fully latched position. When the detection switch 570 is open, an "unlatched" state signal is provided along trace 558 to the present pin 554. The "unlatched" state signal may constitute a first voltage level determined by the initial voltage Vcc and the voltage drop across resistor 572. The "unlatched" state signal indicates that the release mechanism is not in a fully latched position. The "unlatched" state signal may be generated at various stages throughout an unplugging operation of the module assembly 102 from the receptacle assembly 104. For, example, in the embodiment of FIG. 6, the "unlatched" state signal may be generated before or after the ejector tabs 350 fully disengage from the receptacle assembly 104.

In the above examples, the detection switches are normally open switches. Optionally, the switch actuator arm and detection switch may be modified to operate as a normally closed switch when in the unlatched position. Optionally, the switch actuator arm may be constructed to directly bridge the power and present pin contact pads. Optionally, the detection switch may produce signals described above. Optionally, the release mechanism may not directly engage the detection switch, but instead change the detection switch state through magnetic, optical or infrared means.

While the invention has been described in terms of various specific embodiments, those skilled in the art will recognize that the invention can be practiced with modification within the spirit and scope of the claims.

What is claimed is:

1. An electrical module assembly configured to engage a receptacle assembly, the module assembly comprising:
   a module housing configured to be plugged into, and locked in, the receptacle assembly;
   a release mechanism joined to the module housing, the release mechanism being moveable between locked and unlocked positions, the release mechanism being configured to unlock the module housing from the receptacle assembly when the release mechanism moved from the locked position to the unlocked position; and
   a detection switch carried by the module housing, the detection switch monitoring a position of the release mechanism and providing electrical latched and unlatched state signals based on the position of the release mechanism, the latched state signal indicating that the module housing is locked in the receptacle assembly, the unlatched state signal indicating that the release mechanism is being moved to the unlocked position.

2. The assembly of claim 1, wherein the release mechanism includes an actuator arm having a switch actuation member formed thereon and extending forward from a lead end of the actuator arm, the switch actuation member engaging the detection switch when the release mechanism is moved to the locked position.

3. The assembly of claim 1, wherein the detection switch includes a spring element mounted in the module housing, the spring element being movable between a normally open position and a closed position, the switch actuation member deflecting the spring element to the closed position.

4. The assembly of claim 1, wherein the module housing includes a side wall having an interior and an exterior, the release mechanism sliding along the exterior of the side wall, the release mechanism including a switch actuation member that slides along the interior of the side wall to engage and disengage the detection switch.

5. The assembly of claim 1, further comprising a module board located in the module housing, the module board including power and present pin contact pads located thereon, the detection switch closing and opening a connection between the power and present pin contact pads to produce the latched and unlatched state signals, respectively.

6. The assembly of claim 1, further comprising a module board located in the module housing, the module board including a switch signal trace extending along a length thereof, the switch signal trace joined to the detection switch to convey the latched and unlatched state signals to the receptacle module.

7. The assembly of claim 1, wherein the detection switch includes a dielectric member that is positioned to be engaged by the release mechanism when the release mechanism is in the locked position.

8. The assembly of claim 1, wherein the module assembly includes module signal contacts positioned to engage corresponding receptacle signal contacts in the receptacle assembly, the detection switch generating the unlatched state signal at least 100 milliseconds before the module and receptacle signal contacts disconnect from one another.

9. The assembly of claim 1, wherein the release mechanism further comprises a bail pivotally mounted to the module housing, the bail being pivoted to move the release mechanism between the locked and the unlocked positions, the detection switch generating the unlatched state signal when the bail begins to move the release mechanism from the locked position toward the unlocked position.

10. The assembly of claim 1, wherein the detection switch generates the unlatched state signal before the module housing begins to move relative to the receptacle assembly.

11. An electrical module/receptacle system, comprising:
a receptacle assembly having a guide frame and a receptacle connector, the receptacle connector and the guide frame being configured to be mounted to a circuit board with the receptacle connector being positioned within the guide frame;
a module assembly having a module housing with an exterior envelope and an interior cavity, the exterior envelope of the module housing being configured to be plugged into, and locked in, the receptacle assembly;
a release mechanism joined to the module housing, the release mechanism being moveable between locked and unlocked positions, the release mechanism being configured to unlock the module housing from the receptacle assembly when the release mechanism is moved from the locked position to the unlocked position; and
a detection switch located within the interior cavity of the module housing, the detection switch monitoring a position of the release mechanism and providing electrical latched and unlatched state signals based on the position of the release mechanism, the latched state signal indicating that the module housing is locked in the receptacle assembly, the unlatched state signal indicating that the release mechanism is being moved to the unlocked position.

12. The system of claim 11, wherein the release mechanism includes an actuator arm having a switch actuation member formed thereon and extending forward from a lead end of the actuator arm, the switch actuation member engaging the detection switch when the release mechanism is moved to the locked position.

13. The system of claim 11, wherein the detection switch includes a spring element mounted in the interior cavity of the module housing, the spring element being movable between a normally open position and a closed position, the switch actuation member deflecting the spring element to the closed position.

14. The system of claim 11, wherein the guide frame includes an EMI gasket coupled to a forward end of the guide frame to provide EMI shielding.

15. The system of claim 11, further comprising a module board located in the interior cavity of the module housing, the module board including power and present pin contact pads located thereon, the detection switch closing and opening a connection between the power and present pin contact pads to produce the latched and unlatched state signals, respectively.

16. The system of claim 11, further comprising a module board located in the interior cavity of the module housing, the module board including a switch signal trace extending along a length thereof, the switch signal trace joined to the detection switch to convey the latched and unlatched state signals to the receptacle module.

17. The system of claim 11, wherein module and receptacle assemblies include module and receptacle signal contacts positioned to engage one another, the detection switch generating the unlatched state signal before the module and receptacle signal contacts disconnect from one another.

18. The system of claim 11, wherein the release mechanism further comprises a bail pivotally mounted to the module housing, the bail being pivoted to move the release mechanism between the locked and the unlocked positions, the detection switch generating the unlatched state signal when the bail begins to move the release mechanism from the locked position toward the unlocked position.

19. The system of claim 11, wherein the detection switch generates the unlatched state signal before the module housing begins to move relative to the receptacle assembly.

20. The system of claim 11, wherein the receptacle connector conveys the latched and unlatched state signals to components on a circuit board to enable shut down of a data channel maintained through the module and receptacle assemblies before the module and receptacle assemblies are electrically disconnected from one another.

* * * * *